United States Patent [19]

Fitzhugh

[11] Patent Number: 4,854,449

[45] Date of Patent: Aug. 8, 1989

[54] CONTAINER IN WHICH TO CARRY A REUSABLE LENS CLEANING MATERIAL

[76] Inventor: Michael A. Fitzhugh, 1089 Vallejo Cir., Costa Mesa, Calif. 92627

[21] Appl. No.: 225,739

[22] Filed: Jul. 29, 1988

[51] Int. Cl.⁴ .............................................. A45C 11/00
[52] U.S. Cl. .................................. 206/37; 206/37.1; 206/38; 206/38.1; 15/214
[58] Field of Search .................. 206/38, 38.1, 233, 37, 206/37.1; 15/208, 209 R, 210 R, 214

[56] References Cited

U.S. PATENT DOCUMENTS

| | | | |
|---|---|---|---|
| 692,173 | 1/1902 | Wilber | 206/37 R |
| 2,013,027 | 9/1935 | Branch | 206/38 X |
| 2,204,947 | 6/1940 | Apelbaum | 206/37 R |
| 3,306,266 | 2/1967 | McCunney | 206/37 X |
| 3,647,059 | 3/1972 | Humphreys | 15/214 X |

FOREIGN PATENT DOCUMENTS 2732355 2/1979 Fed. Rep. of Germany ........ 15/214

304989 1/1929 United Kingdom .................. 15/214

*Primary Examiner*—William Price
*Attorney, Agent, or Firm*—Morland C. Fischer

[57] ABSTRACT

A container having a hollow body that provides a dirt free, moisture resistent environment in which a soft, reusable lens cleaning (e.g. chamois) material is removably located. A detachable end plug is received within an open end of the container. The end plug is connected to the lens cleaning material by way of a length of chain and an associated connector. Pulling the end plug outwardly from the open end of the container correspondingly causes the cleaning material to be removed therefrom. After use, the material is returned to the interior of the container and the end plug is reattached to the open end thereof. The container is of a suitably compact size so as to be easily carried within a handbag or pocket of the user to provide a convenient and readily available means for cleaning the lens of a pair of glasses, a camera, and the like.

15 Claims, 2 Drawing Sheets

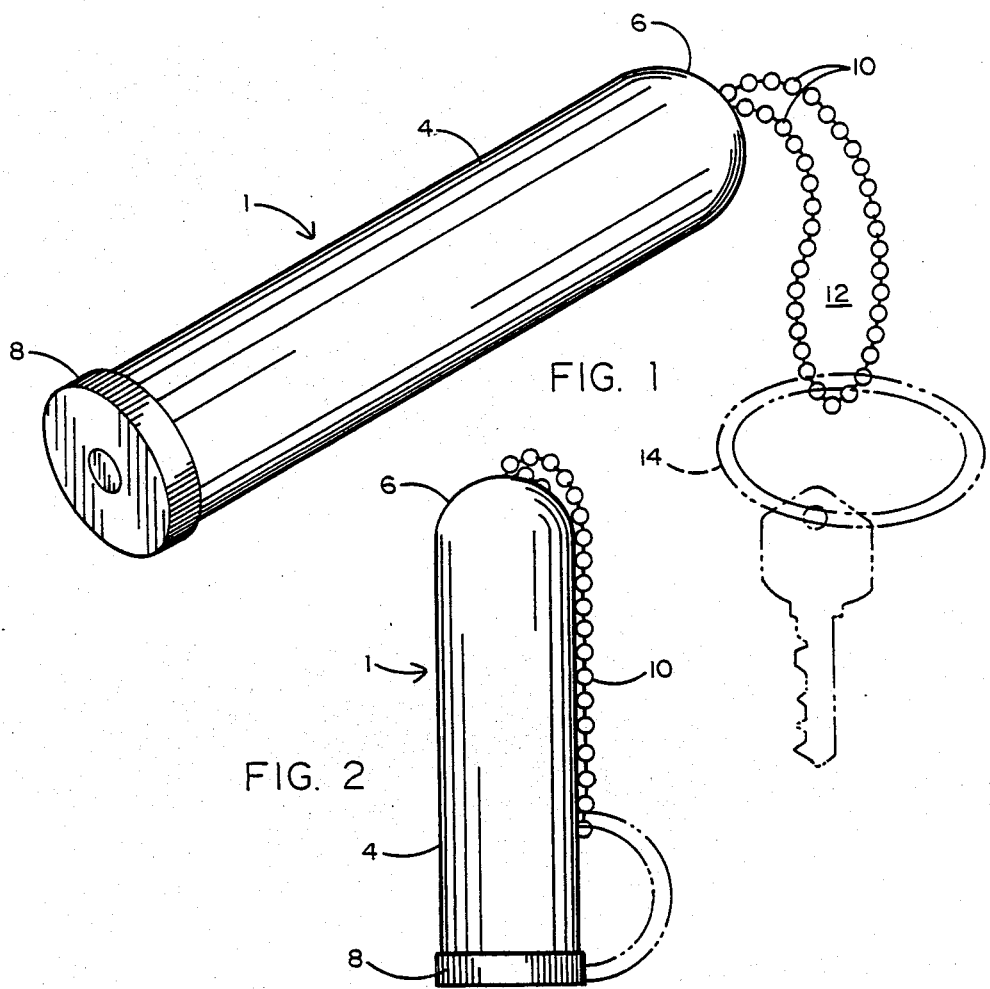
FIG. 1
FIG. 2
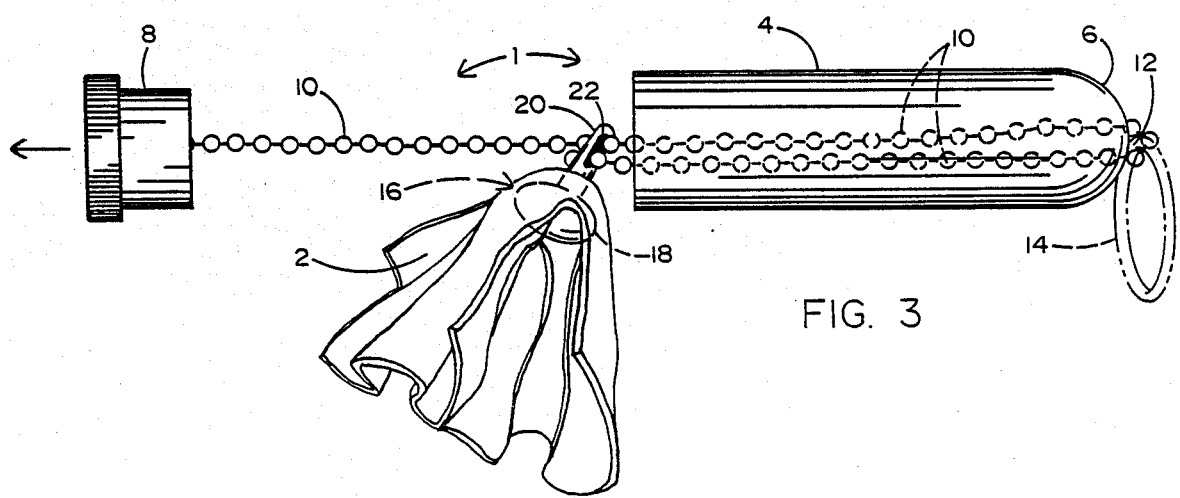
FIG. 3

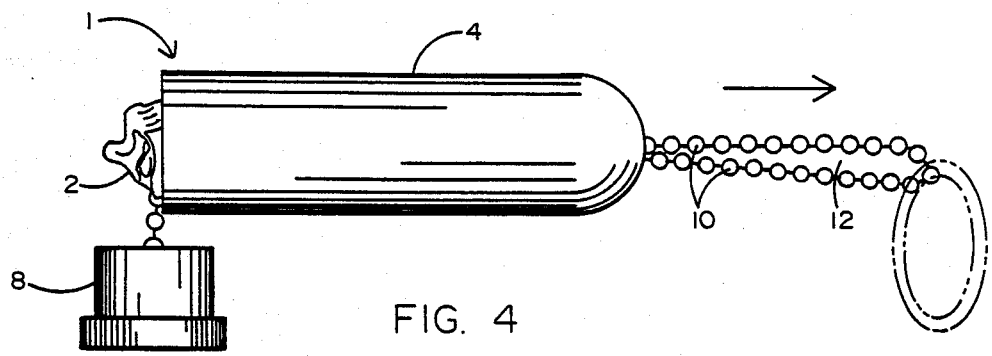
FIG. 4
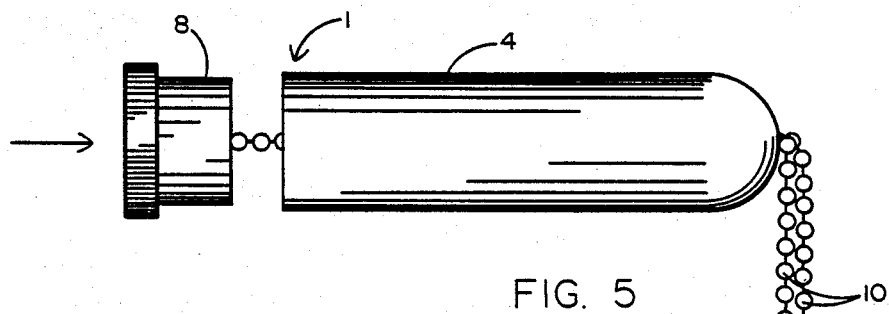
FIG. 5
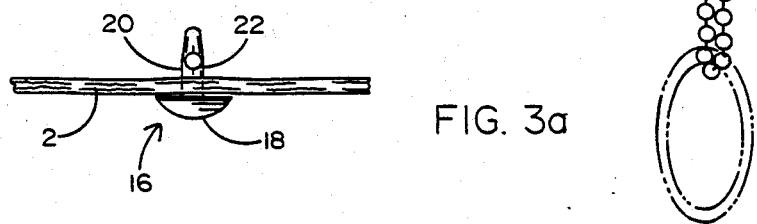
FIG. 3a
FIG. 6
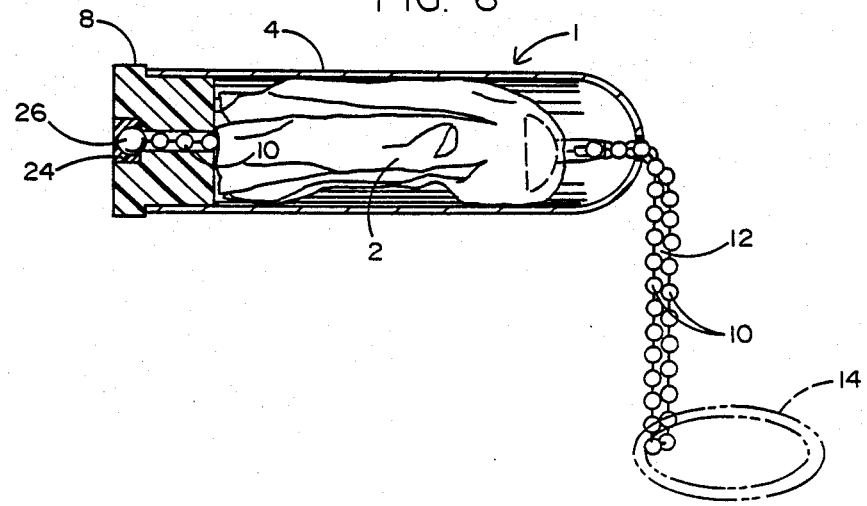

CONTAINER IN WHICH TO CARRY A REUSABLE LENS CLEANING MATERIAL

BACKGROUND OF THE INVENTION

1. Field of the Invention

This invention relates to a compact container having a hollow body in which a soft, reusable lens cleaning material may be conveniently carried and easily removed for the purpose of cleaning the lens of a pair of glasses, a camera, and the like.

2. Prior Art

As will be known by the wearers of glasses, if frequently becomes necessary to clean one's glasses to remove dirt, oily films, moisture, etc. Inasmuch as a suitable cleaning material may not always be available, the wearer might have to substitute a relatively abrasive material. Consequently, the lenses may become scratched. Moreover, the substitute cleaning material may not adequately clean the glasses but may, otherwise, merely smear the glasses and, thereby, worsen the condition that was to be remedied. What is more, it may not be desirable to reuse the substitute cleaning material, which would require the wearer to find a new supply of such material each time that his glasses needed to be cleaned. Of course, by carrying a lens cleaning material loosely within one's pocket or purse, such material would be susceptable to a dirt or moisture filled environment which would prevent reuse and/or necessitate a premature disposal thereof.

It would be much more desirable if a compact container were available so that a reusable, non-abrasive material could be conveniently carried within a dirt free and moisture resistant environment, whereby to provide a user with a readily accessible means for cleaning the lenses of his glasses, and the like.

SUMMARY OF THE INVENTION

In general terms, a compact container is disclosed having a hollow body in which a soft reusable lens cleaning material is removably received. The material is particularly applicable to the cleaning of such lenses as are common to a pair of glasses, a camera, and the like. The container provides a relatively dirt free, moisture resistent body in which the lens cleaning material is carried so as to be easily accessible to the user. Moreover, the container may be advantageously transported within the pocket or purse of the user so that the material is readily available as often as is required.

More particularly, the container includes a closed end and a detachable plug located within an open, opposite end. The end plug is connected to the lens cleaning material by a length of conventional ball and link chain. That is, the chain extends through the container from the end plug, outwardly and then inwardly of the container via a small opening in the closed end thereof to form an exterior loop, and then to a connector to which the lens cleaning material is attached. The loop of the chain provides a convenient means for attaching a key ring or the like, so that one or more keys and/or other personal objects may be carried at the exterior of the container.

In operation, the user detaches the end plug from the open end of the container. Inasmuch as the end plug is attached to the lens cleaning material via the chain and connector, a removal of the end plug correspondingly causes the material to be pulled out of the container. After the lens cleaning material has been used for its intended purpose, the loop of the chain is pulled outwardly from the container to return the lens cleaning material to the interior of the container. The end plug is then replaced within the open end of the container, wherein the material may be carried until a subsequent use is required.

BRIEF DESCRIPTION OF THE DRAWINGS

FIG. 1 is a perspective view of the container which forms the present invention interconnected with an optional key ring;

FIG. 2 is a front view of the container of FIG. 1 in a fully closed configuration with a lens cleaning material carried therewithin;

FIG. 3 is a side view of the container in a fully open configuration with the lens cleaning material removed therefrom;

FIG. 3a is a detail showing the lens cleaning material and an associated connector;

FIG. 4 illustrates one step of the method for returning the container from the fully open to the fully closed configuration;

FIG. 5 illustrates a subsequent step of the method for returning the container to the fully closed configuration; and FIG. 6 is a cross section of the container in the fully closed configuration.

DESCRIPTION OF THE PREFERRED EMBODIMENT

The container 1 in which a lens cleaning material is removably received is best described while referring to the drawings, where FIGS. 1 and 2 show the container 1 in a closed configuration with the lens cleaning material (designated 2 in FIG. 3) carried at the interior thereof. Container 1 may be formed from any suitable material including impact resistent plastic or light weight, polished metal so as to possess an aesthetically pleasing appearance. Container 1 has a hollow cylindrical body 4 with a hemispherically shaped nose portion 6 coextensively formed with body 4 at a closed end thereof and a detachable plug 8 located at an open, opposite end of body 4. As will soon be explained, end plug 8 is detachably secured at the open end of the body 4 of connector 1 to permit the user to selectively gain access to the hollow interior of said body and to the lens cleaning material located therewithin. Although the body 4 of container 1 is described and illustrated as having a cylindrical configuration, it is to be understood that this is not to be regarded as a limitation of the present invention, and body 4 may have any other suitable configuration in which to receive the lens cleaning material.

A length of conventional ball and link chain 10 extends through the hollow interior of the container body 4. One end of chain 10 is connected to the end plug 8 (best illustrated in FIG. 6). The chain then extends outwardly from and inwardly into the body 4 through a small opening in the closed nose portion 6 thereof (best shown in FIG. 3) to form a loop 12 at the outside of container 1. Accordingly, the loop 12 may serve as a convenient means for permitting a key ring 14, or the like, to be coupled to the container 1 so that one or more keys and/or other personal items may be easily carried and quickly located. Moreover, the key 14 prevents the loop 12 from being pulled inwardly and into the interior of housing 4 through the opening in the closed nose portion 6.

Referring now to FIG. 3, the end plug 8 is shown detached from the open end of the body 4 of container 1 so that the lens cleaning material 2 can be removed therefrom. It is preferable that cleaning material 2 be a soft, reusable material, such as that commonly known as chamois. However, it is within the scope of this invention to also form cleaning material 2 from other non-abrasive cloth-like materials or relatively thin paper which is known to have particular application for the cleaning of lenses.

As is shown in FIGS. 3 and 3a, the cleaning material 2 is interfaced with chain 10 by means of a connector 16. Connector 16 is preferably made from plastic and comprises a relatively wide base end 18 and a relatively narrow rod end 20 extending upwardly from said base end 18. A generally oval-shaped aperture 22 is formed through the rod end 20 of connector 16.

In the assembled relationship, a hole is punched through the lens cleaning material 2. The narrow rod end 20 of connector 16 is pushed through the hole in material 2, such that the wide base end 18 is moved flush against one face of material 2, and the opening 22 in rod end 20 projects above the opposite face of material 2. As previously indicated and best shown in FIG. 3, one end of chain 10 is attached to end plug 8. The other, free end of chain 10 is pulled in a first direction through and outwardly of the hollow body 4 of container 1 by way of the aperture 22 in connector 16 and the opening at the nose portion 6 of body 4. The chain turns back upon itself to form the loop 12 and is then reinserted through the opening of nose portion 6 to be pulled in an opposite direction through body 4. The free end of chain 10 is then attached to connector 16 at the aperture 22 in rod end 20. Accordingly, the material 2 is securely attached to connector 16 between the base and rod ends 18 and 20 thereof. Moreover, the dimensions of oval-shaped aperture 22 prevents the free end of chain 10 from being inadvertently disengaged therefrom, whereby to preserve the loop 12 for reliably retaining a key ring 14, or the like.

FIG. 3 shows the container 1 in the fully open configuration with the end plug 8 detached from the body 4 of container 1. By removing (i.e. pulling) end plug 8 (in the direction of the reference arrow) from container 1, the majority of the loop 12 of chain 10 is pulled into the body 4 via the opening in hole portion 6, while the lens cleaning material 2 is removed from said body via the open end thereof. That is to say, inasmuch as end plug 8 and connector 16 are interconnected with one another by means of chain 10, the removal of plug 8 causes a corresponding removal of the connector 16 and the lens cleaning material 2 which is connected thereto. The material 2 may then be used for any suitable purpose, such as for cleaning the lenses of a pair of glasses.

In FIG. 4 of the drawings, after the material 2 has been used for its intended purpose, the loop 12 of chain 10 is pulled (in the direction of the reference arrow) outwardly from the body 4 of container 1. Accordingly, the material 2, which is attached to chain 10 at connector 16, is pulled into the hollow interior of body 4. The end plug 8 which is, likewise, attached to chain 10 is, correspondingly, pulled towards the open end of body 4. In FIG. 5, the user pushes the end plug 8 (in the direction of the reference arrow) into the open end of body 4 so as to close the container 1 with the lens cleaning material received therewithin.

FIG. 6 of the drawings shows the container 1 in the fully closed configuration with the end plug 8 detachably secured across the open end of said container so that the lens cleaning material 2 is located completely within and surrounded by the hollow body 4. Thus, the material 2 is retained within a closed environment that can withstand dirt and moisture. What is more, the container 1 is provided with a compact configuration so as to be carried within a purse or a pocket of the user with a key or other personal article attached to chain 10 by means of key ring 14. In the event that access to the lens cleaning material 2 is once again desired, the user need only detach end plug 8 from body 4 in the manner previously described while referring to FIG. 3 in order to automatically and conveniently remove the material 2 from container 1.

FIG. 6 also illustrates a preferred means for connecting chain 10 to the end plug 8 so that the detachment of plug 8 from container 1 causes a corresponding removal of material 2. More particularly, the end plug 8 is of solid cross section except for a tapered axially extending channel 24. The chain 10 is fed through a hole in a plug 8 until a relatively large ball or bead 26 is received within channel 24. Because of its tapered configuration, the channel 24 will act as a stop to capture the large bead 26 and thereby retain chain 10 in engagement with plug 8. It may then be desirable to fill the hole in plug 8 through which chain 10 is fed with a conventional filler or similar cement.

It will be apparent that while a preferred embodiment of the invention has been shown and described, various modifications and changes may be made without departing from the true spirit and scope of the invention. For example, although the container 1 has been described in the preferred embodiment as carrying a material that is particularly adapted to clean the lenses of a pair of glasses, it is to be understood that the material which is received in and carried by container 1 may also have application for cleaning the lens of a camera, and the like.

Having thus set forth the preferred embodiment of the invention, what is claimed is:

1. A container in which a lens cleaning material is to be carried, said container comprising a hollow housing having an open end, an end plug detachably secured across the open end of said housing, a lens cleaning material removably received within said container housing, and linking means by which to link said lens cleaning material to said end plug, such that said material is removed, but not separated, from said housing at the same time that said end plug is detached from the open end of and removed from said housing.

2. The container recited in claim 1, wherein said linking means also links said end plug to said housing, such that said end plug can be detached, but not separated, from said housing when said end plug is detached from the open end thereof.

3. The container recited in claim 1, wherein said linking means includes a chain.

4. The container recited in claim 3, wherein said container housing has an opening formed in a closed end thereof opposite the open end at which said end plug is detachably secured, said chain extending outwardly and then inwardly of said container via the opening in said housing to form a loop located outside said container.

5. The container recited in claim 4, further comprising a key ring attached to the loop of said chain and located outside said container so that keys, and the like, may be connected thereto, said key ring also preventing said loop from being pulled completely within said container housing via the opening in the closed end of said housing.

6. The container recited in claim 3, wherein said chain is interconnected between said end plug at one end thereof and said lens cleaning material at the opposite end.

7. The container recited in claim 1, further comprising a connector interconnected between said linking means and said lens cleaning material.

8. The container recited in claim 7, wherein said connector has a relatively wide base end and a relatively narrow rod end having an aperture formed therein, said base end engaging said lens cleaning material and said rod end extending from said base end through a hole in said material to be connected to said linking means at the aperture formed in said rod end.

9. The container recited in claim 7, wherein said end plug is connected to said connector by way of said linking means, such that a detachment of said end plug from said container housing causes a corresponding removal of said connector and said lens cleaning material interconnected thereto via the open end of said housing.

10. The container recited in claim 1, wherein said lens cleaning material is a chamois.

11. A container in which a lens cleaning material is to be carried, said container comprising:
    a hollow housing having an open end and a closed end, said closed end having an opening formed therethrough,
    an end cap detachably secured across the open end of said housing,
    a lens cleaning material removably received within said container housing, and
    a chain connected to said lens cleaning material and extending from said end cap at the open said housing to the exterior of said housing via the opening in the closed end thereof at which to link said chain to said housing, such that said end cap can be detached and said lens cleaning material removed, but not separated, from said housing.

12. The container recited in claim 11, further comprising a connector to connect said lens cleaning material to said chain, such that a detachment of said end cap from said container housing causes a corresponding removal of said connector and said lens cleaning material via the open end of said housing.

13. The container recited in claim 11, wherein said chain extends from said end cap, outwardly and then inwardly of said housing through the opening in the closed end thereof to form a loop at the exterior of said housing.

14. The container recited in claim 13, further comprising a key ring attached to the loop of said chain at the exterior of said housing, said key ring linking said chain to said housing and thereby preventing the separation of said lens cleaning material form said housing.

15. A container in which a lens cleaning material is to be carried, said container comprising:
    a hollow housing having an open end,
    an end cap detachably secured across the open end of said housing,
    a lens cleaning material removably received within said container housing,
    a chain linked to said housing and extending between said end cap and said lens cleaning material, and
    a connector to connect said lens cleaning material to said chain, such that a detachment of said end cap from said container housing causes a corresponding removal of said connector and said lens cleaning material from said housing via the open end.

* * * * *